US010952373B2

(12) United States Patent
Rittershofer et al.

(10) Patent No.: US 10,952,373 B2
(45) Date of Patent: Mar. 23, 2021

(54) STRAW DEFLECTOR FOR AN AGRICULTURAL COMBINE

(71) Applicant: Deere & Company, Moline, IL (US)

(72) Inventors: Martin Rittershofer, East Moline, IL (US); Michael T. Meschke, Geneseo, IL (US); Matthew T. Wold, East Moline, IL (US); Gregor Diessner, Schweigen-Rechtenbach (DE); Marco Broschart, Herschberg (DE)

(73) Assignee: Deere & Company, Moline, IL (US)

( * ) Notice: Subject to any disclaimer, the term of this patent is extended or adjusted under 35 U.S.C. 154(b) by 150 days.

(21) Appl. No.: 16/008,753

(22) Filed: Jun. 14, 2018

(65) Prior Publication Data

US 2019/0059218 A1 Feb. 28, 2019

Related U.S. Application Data

(60) Provisional application No. 62/551,501, filed on Aug. 29, 2017.

(51) Int. Cl.
| | | |
|---|---|---|
| A01D 41/12 | (2006.01) | |
| A01F 12/40 | (2006.01) | |
| A01F 12/44 | (2006.01) | |
| A01F 29/04 | (2006.01) | |
| A01D 82/02 | (2006.01) | |

(52) U.S. Cl.
CPC .......... *A01D 41/1243* (2013.01); *A01F 12/40* (2013.01); *A01F 12/444* (2013.01); *A01F 29/04* (2013.01); *A01D 82/02* (2013.01); *A01F 12/446* (2013.01)

(58) Field of Classification Search
CPC ... A01D 41/1243; A01F 12/40; A01F 12/444; A01F 12/446; A01F 29/04
See application file for complete search history.

(56) References Cited

U.S. PATENT DOCUMENTS

| 16,103 | A | * | 11/1856 | Lyndall | .................. | A01F 12/00 |
| | | | | | | 460/96 |
| 59,440 | A | * | 11/1866 | Nichols et al. | .... | A01D 41/1243 |
| | | | | | | 460/96 |
| 213,156 | A | * | 3/1879 | Allonas | .................. | A01F 12/00 |
| | | | | | | 460/96 |

(Continued)

FOREIGN PATENT DOCUMENTS

| DE | 2444550 A1 * | 4/1976 | ......... A01D 41/1243 |
| EP | 0727135 A1 * | 8/1996 | ......... A01D 41/1243 |

(Continued)

OTHER PUBLICATIONS

EP Application No. 18189463.5 European Extended Search Report dated Jan. 14, 2019, 6 pages.

*Primary Examiner* — Thomas B Will
*Assistant Examiner* — Joan D Misa
(74) *Attorney, Agent, or Firm* — Joseph R. Kelly; Kelly, Holt & Christenson PLLC

(57) ABSTRACT

A residue deflector is disposed in a combine body, and positioned along an airflow path to guide residue from an exit end of a cleaning shoe and a threshing and separation assembly, to a residue chopper. The deflector is configured with a plurality of spaced fingers so that air can pass through the deflector between the fingers.

20 Claims, 7 Drawing Sheets

(56) References Cited

U.S. PATENT DOCUMENTS

| | | | | |
|---|---|---|---|---|
| 251,951 A * | 1/1882 | Robinson | A01D 41/1243 | 460/96 |
| 772,402 A * | 10/1904 | Carter | A01F 12/00 | 460/96 |
| 831,421 A * | 9/1906 | Dunkelberger | A01F 12/00 | 460/96 |
| 1,639,447 A * | 8/1927 | Anderson | A01D 41/1243 | 239/681 |
| 2,502,032 A * | 3/1950 | Watson | A01F 12/40 | 241/47 |
| 3,163,472 A * | 12/1964 | Zeismer | B07B 7/06 | 406/171 |
| 3,306,015 A * | 2/1967 | Myers | A01D 34/42 | 56/12.7 |
| 3,521,687 A * | 7/1970 | Gaeddert | A01F 12/40 | 241/80 |
| 3,669,123 A * | 6/1972 | Gaeddert | A01F 12/40 | 460/112 |
| 3,683,602 A * | 8/1972 | Scarnato | A01D 43/107 | 56/14.4 |
| 4,056,107 A * | 11/1977 | Todd | A01D 41/1243 | 460/112 |
| 4,646,757 A * | 3/1987 | Schmitt | A01F 12/40 | 241/101.71 |
| 4,711,253 A * | 12/1987 | Anderson | A01D 41/1243 | 460/100 |
| 4,913,679 A * | 4/1990 | Bender | A01F 12/40 | 414/505 |
| 6,908,379 B2 * | 6/2005 | Gryspeerdt | A01D 41/1243 | 460/111 |
| 7,008,315 B2 * | 3/2006 | Redekop | A01D 41/1243 | 460/112 |
| 7,063,613 B2 * | 6/2006 | Weichholdt | A01F 12/40 | 460/112 |
| 7,220,179 B2 * | 5/2007 | Redekop | A01D 41/1243 | 460/112 |
| 7,544,126 B2 * | 6/2009 | Lauer | A01D 41/1243 | 460/111 |
| 7,744,450 B2 * | 6/2010 | Hoskinson | A01F 12/44 | 460/84 |
| 8,079,900 B2 * | 12/2011 | Klein | A01D 41/1243 | 460/111 |
| 9,107,349 B2 * | 8/2015 | Dilts | A01D 41/1243 | |
| 9,137,944 B2 * | 9/2015 | Dilts | A01D 41/1243 | |
| 9,554,518 B2 * | 1/2017 | Murray | A01F 12/00 | |
| 9,578,803 B2 * | 2/2017 | Desmet | A01F 12/00 | |
| 10,225,987 B2 * | 3/2019 | Foster | A01D 41/1243 | |
| 10,321,634 B2 * | 6/2019 | Bilde | A01F 12/44 | |
| 10,499,566 B2 * | 12/2019 | Puryk | A01F 12/40 | |
| 2002/0086722 A1 * | 7/2002 | Kuhn | A01D 41/1243 | 460/100 |
| 2005/0101363 A1 * | 5/2005 | Farley | A01D 41/1243 | 460/112 |
| 2005/0282602 A1 * | 12/2005 | Redekop | A01D 41/1243 | 460/112 |
| 2008/0305841 A1 * | 12/2008 | Overschelde | A01D 41/1243 | 460/59 |
| 2016/0135377 A1 * | 5/2016 | Ballegeer | A01D 41/1243 | 460/112 |

FOREIGN PATENT DOCUMENTS

| | | | | |
|---|---|---|---|---|
| EP | 0727135 A1 | 8/1996 | | |
| EP | 3414989 A1 | 12/2018 | | |
| WO | WO-2016105457 A2 * | 6/2016 | | A01F 12/444 |

\* cited by examiner

STRAW DEFLECTOR FOR AN AGRICULTURAL COMBINE

CROSS-REFERENCE TO RELATED APPLICATION

The present application is based on and claims the benefit of U.S. provisional patent application Ser. No. 62/551,501, filed Aug. 29, 2017, the content of which is hereby incorporated by reference in its entirety.

FIELD OF THE DESCRIPTION

This description relates to agricultural combines. More particularly, it relates to structures for deflecting straw, corncobs and other crop residue material from a flow of air in the body of a combine.

BACKGROUND

Large quantities of air are blown out of the back of agricultural combines. The air is generated by one or more fans in the combine and is used to separate grain from material other than grain (MOG). As the threshing, separating and cleaning capacity of combines increases, more airflow through the combine is provided. This increased airflow has meant that combines are made with a larger airflow path through the combine.

Some combines are configured with a chopper. The copper receives and chops the MOG before it leaves the combine. The chopped MOG can be spread by a spreader or dropped into a windrow.

As the airflow path through the combine increases, there is a risk that MOG that should be chopped will not be chopped, but will bypass the combine residue chopper and be thrown out the back of the combine. Further, some of the MOG may be chopped in the combine residue chopper, and thrown back into the combine cleaning shoe where it could damage the sieves and chaffers.

The discussion above is merely provided for general background information and is not intended to be used as an aid in determining the scope of the claimed subject matter.

SUMMARY

A residue deflector is disposed in a combine body, and positioned along an airflow path to guide residue from an exit end of a cleaning shoe and a threshing and separation assembly, to a residue chopper. The deflector is configured with a plurality of spaced fingers so that air can pass through the deflector between the fingers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description describes a residue deflector internal to the combine in the main air flow path of the combine. It is positioned to deflect crop residue downward into the combine residue chopper, while permitting air to continue through the combine on its main airflow path. The residue deflector can also inhibit large pieces of MOG (e.g., corncobs) from being thrown in a direction opposite to the airflow and into the cleaning shoe where the large pieces could damage the sieves and chaffers.

Figure 1:
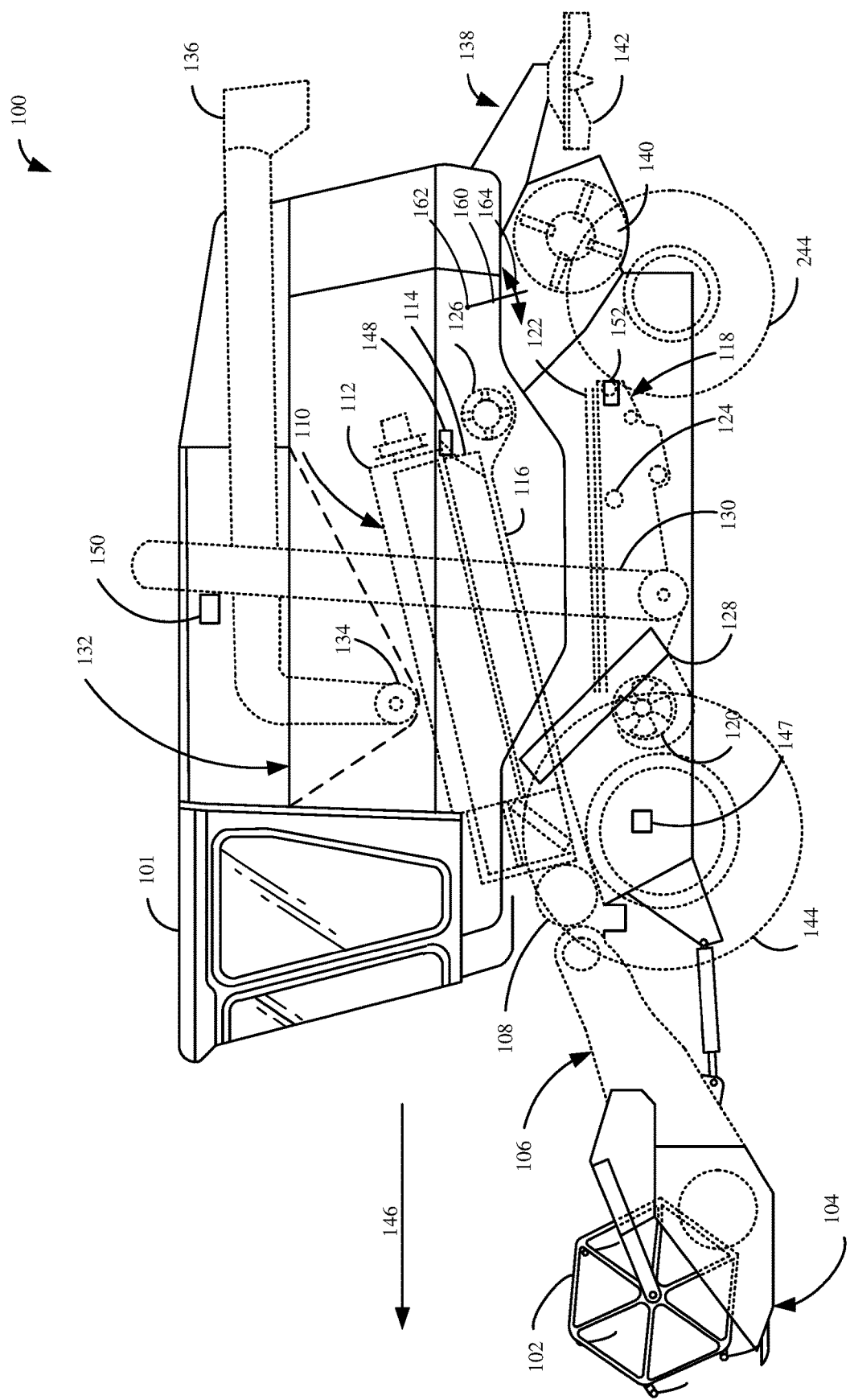
FIG. 1 is a partial pictorial, partial schematic diagram of a combine harvester.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other configurations, the residue is simply chopped and dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. Cleaning fan 120 directs air along an airflow path upwardly through the sieves and chaffers and the airflow carries residue can also be rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

The airflow through combine 100 (generated by cleaning fan 120 and/or other fans) can become strong enough that it carries residue from the exit end of discharge beater 126 and from the exit end of the cleaning shoe 118 over the top of chopper 140 and out of the back of combine 100 without being chopped. Further, some of the crop residue that passes into the chopper 140 may be carried upward and back over the top of the combine residue chopper 140. This over-the-top movement throws the crop residue back into the air path in a reverse direction, and toward the cleaning shoe 118. This backward moving residue can hit and damage the sieves and chaffers of the cleaning shoe 118.

Therefore, residue deflector 160 is disposed in the airflow path so that it deflects crop residue downward and into chopper 140. Deflector 160, as is described in more detail below, allows air to pass through it and out the rear of combine 100. In one example, deflector 160 has an actuator that drives it to rotate about pivot axis 162 in the direction indicated by arrow 164. This allows deflector 160 to be pivoted upwardly, out of the airflow path (e.g., to lay a windrow) or downwardly, to various positions, in the airflow path to deflect residue into chopper 140.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
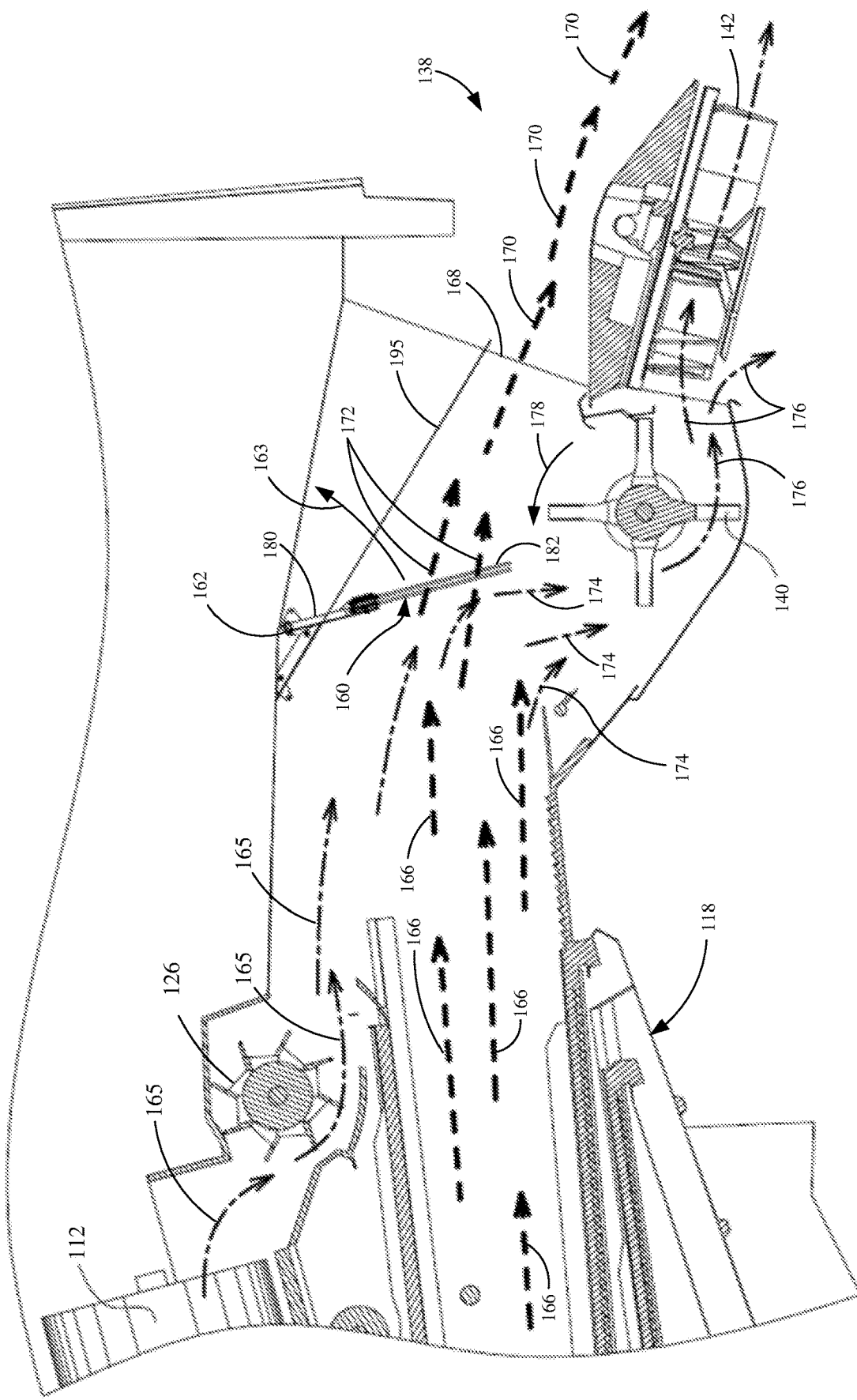
FIG. 2 is a more detailed diagram illustrating a position of a reside deflector.

FIG. 2 is an enlarged view of a portion of combine 100. FIG. 2 shows the exit end of rotor 112. It also shows beater 126, chopper 140 and spreader 142, as well as residue deflector 160. Crop residue that exits the threshing and separating mechanism is often carried rearward toward discharge beater 126. This travel path is indicated by arrows 165 in FIG. 2. This type of residue is often referred to as "straw". Another flow of residue (referred to as "chaff") is carried rearward by the flow of air generated by cleaning fan 120. This airflow passes upward through the sieve and chaffer of the cleaning shoe 118 and is generally indicated by arrows 166 in the flow diagram of FIG. 2. When the airflow generated by the cleaning fan 120 is sufficiently large (and without deflector 160 deployed in the airflow path, this can carry residue which exists cleaning shoe 118 (carried by the airflow) and discharge beater 126 out of the exit end 168 of combine 100, over the top of chopper 140 and spreader 142. This is indicated by arrows 170 in FIG. 2. However, in the example shown FIG. 2, deflector 160 is positioned within the airflow path indicated by arrows 166. In one example, it is positioned upstream in the airflow path of an outlet side of chopper 140. In another example, it is positioned upstream of the inlet side of chopper 140. It can be deployed to other deployed positions as well.

As is described in greater detail below, deflector 160 is configured so that air can pass through it, as indicated by arrows 172, but residue from the outlet end of discharge beater 126 and from cleaning shoe 118, contacts deflector 160, and is therefore deflected downward, as indicated by arrows 174 in FIG. 2. The residue is thus directed to the inlet end of chopper 140, where it is chopped and moved rearwardly, towards spreader 142, where it spread. This is indicated by arrows 176 in FIG. 2. Also, any crop residue that may be carried upward, over the top of chopper 140, against the airflow in combine 100 (as indicated by arrow 178) again contacts residue deflector 160 and is directed back downward into chopper 140.

The opposing sidewalls of combine 100 illustratively support residue deflector 160 for pivotal arrangement about substantially horizontal and laterally extending pivot axis 162. FIG. 2 also shows a deflector 195 that is mounted to cross member 180 and guides airflow downwardly as indicated by arrows 170 and 172. Residue deflector 160 can be rotated about axis 162 from its deployed position in FIG. 2 to a stored position (in the direction shown by arrow 163) to raise all of the extending members 182 out of the airflow path. The deflector 195 also rotates with deflector 160 to the stored position.

Figure 3:
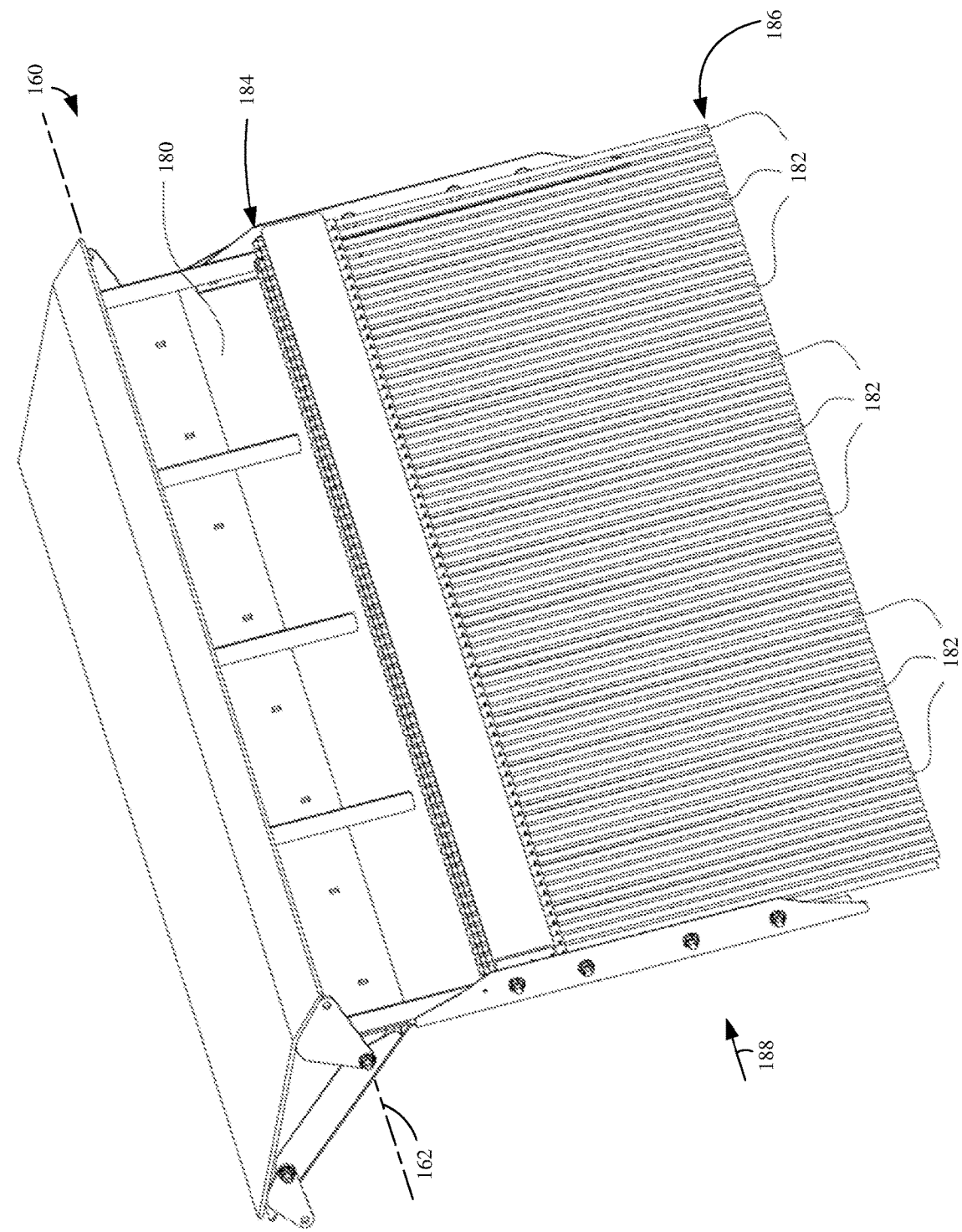
FIG. 3 is a perspective view of one example of the residue deflector shown in FIG. 2.

FIG. 3 is a more detailed view of one example of residue deflector 160. It is assumed that combine 100 has a front and a rear separated in a front-to-rear direction. Combine 100 also has two sides separated in a side-to-side direction. In the example shown in FIG. 3, residue deflector 160 illustratively includes an elongate member 180 that extends substantially laterally across the airflow path shown in FIG. 2, in the side-to-side direction across at least a portion of the width of the interior of combine 100. Elongate member 180 is coupled to a plurality of extending, spaced apart members 182, extending away from elongate member 180 generally downwardly with respect to the orientation shown in FIGS. 2 and 3. Thus, the extending spaced apart members 182 form the teeth of a comb or rake. They are joined together at their first (upper) ends 184 by elongate member 180. However, they are free and spaced apart from one another and unsupported at their lower ends 186, but are instead cantilevered downward from elongate member 180. There is no cross profile structure joining their free lower ends 186. This arrangement allows the residue to engage the elongate members 182 and to fall downwardly (into the inlet side of chopper 140 as shown in FIG. 2) without becoming lodged or caught at the lower ends 186 of members 182.

Figure 4:
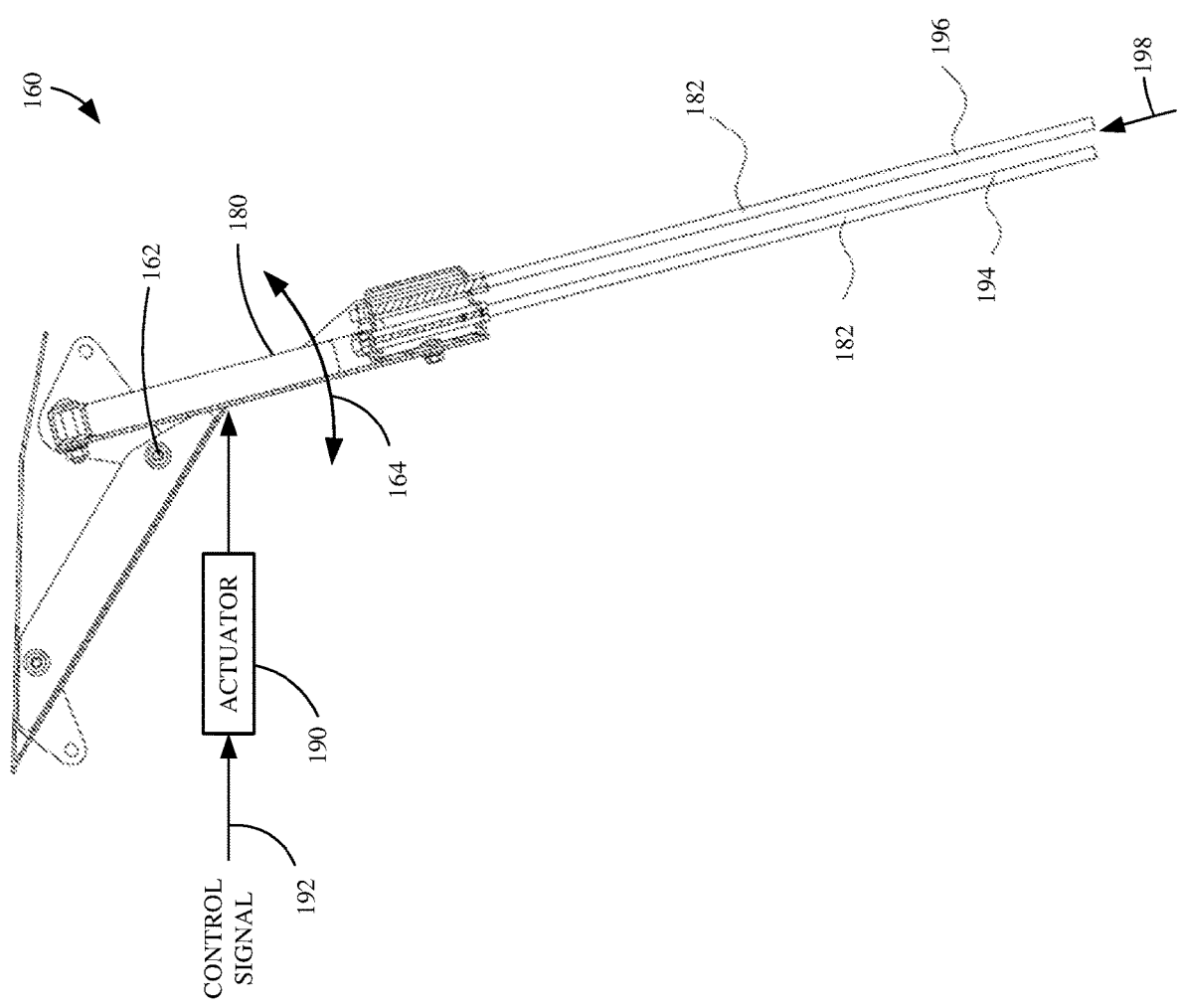
FIG. 4 is a side view showing one example of a side profile of the residue deflector shown in FIGS. 2 and 3.

FIG. 4 is a side view of residue deflector 160 (shown in FIG. 3) taken in the direction indicated by arrow 188. FIG. 4 shows that, in one example, residue deflector 160 is pivotally attached to the frame of combine 100 along pivot axis 162. A controllable actuator 190 can be controlled using a control signal 192 (generated based upon an operator input or a sensor input—such as a fan speed sensor signal—or based on another input) by a control system of combine 100. For example, a sensed cleaning fan speed can cause the control system to actuate actuator 190. This is only one example. Actuator 190 can be actuated to drive rotational movement of residue deflector 160 about axis 162, generally in the directions indicated by arrow 164. Actuator 190 can be any suitable type of actuator, such as hydraulic cylinder, an electric actuator, or another type of actuator.

FIG. 4 also shows that, in one example, the extending members 182 can be arranged in two or more different rows 194 and 196 that are offset from one another in the direction of the airflow (e.g., in the front-to-rear direction). This is described in more detail with respect to FIG. 5.

Figure 5:
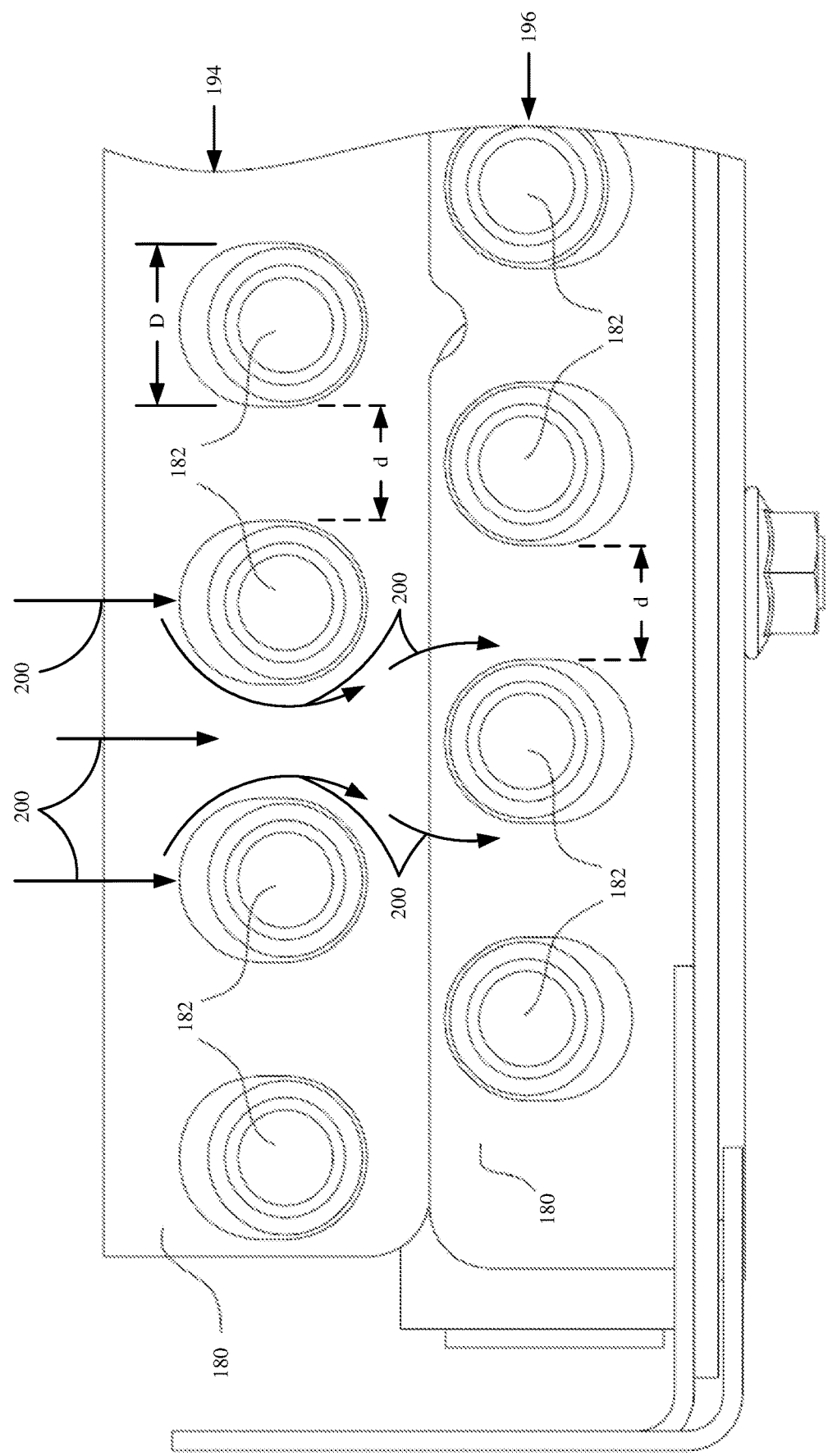
FIG. 5 shows a view of the residue deflector looking up toward a top portion of the residue deflector.

FIG. 5 is a pictorial view of residue deflector 160, taken in the direction indicated by arrow 198 in FIG. 4. FIG. 5 shows that, in one example, the two rows 194 and 196 of extending members 182 are offset from one another in both the front-to-rear direction and the side-to-side direction. This creates a circuitous airflow path through members 182, as indicated by arrows 200. This enhances the ability of residue deflector 160 to catch more residue and deflect it downwardly into the inlet of chopper 140, while still allowing airflow to pass through deflector 160.

In the example shown in FIG. 5, members 182 are spaced apart from one another by a constant distance d, and are generally circular in cross-section. In one example, the distance d between adjacent members 182 is between approximately one and three times the diameter D of each member 182. It will be noted, however, that the cross section of elongate members 182 can have substantially any shape. In addition, the spacing can vary widely as well. Further, while a circuitous path indicated by arrows 200 may be used in some examples, it need not be used in every example. Thus, for instance, when members 182 are spaced from one another by a distance d that is three times the diameter D of each member 182, then some of the air flow will be circuitous, while other portions of the airflow will not. This and other arrangements are contemplated herein.

Figure 6:
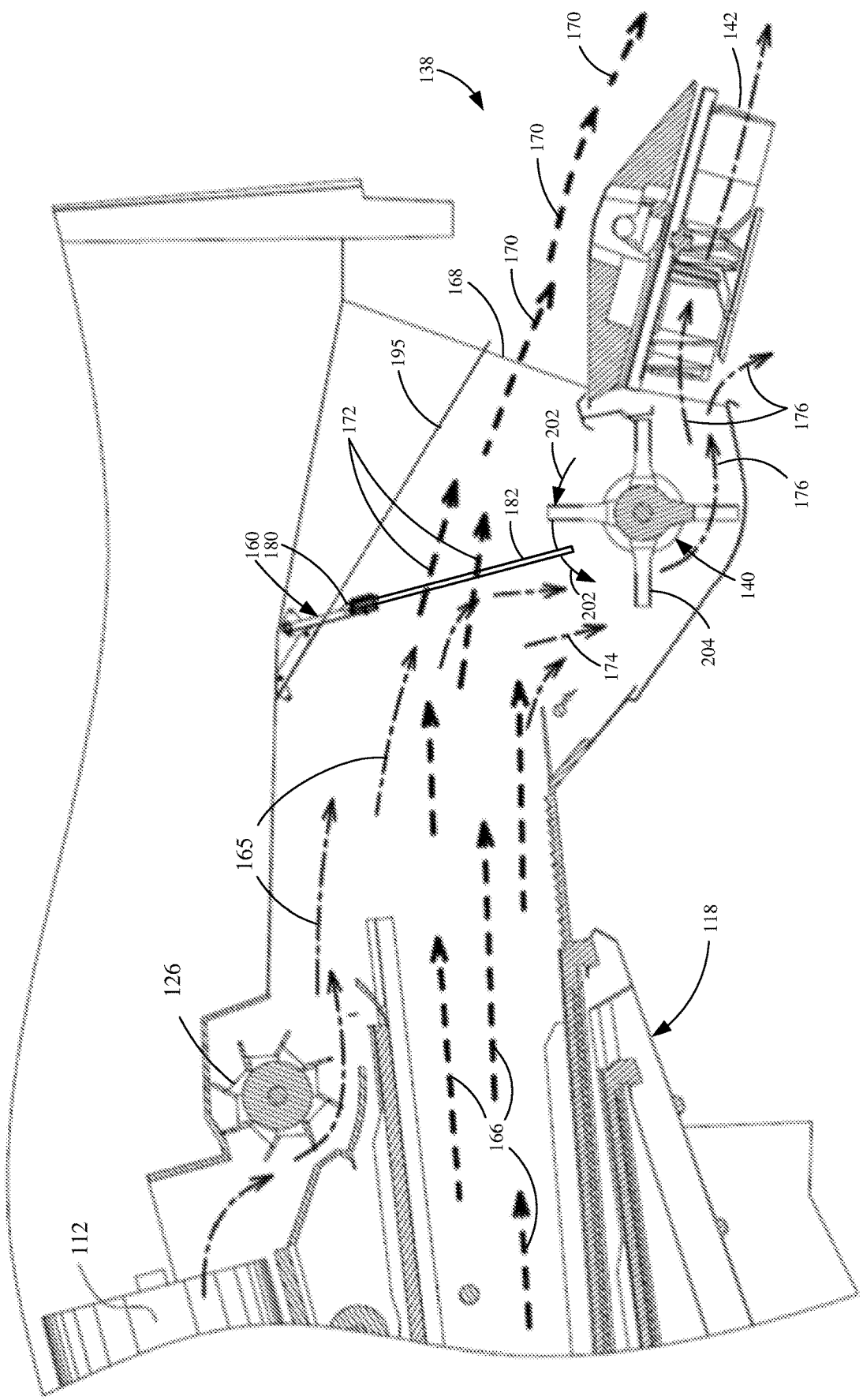
FIGS. 6 and 7 show another example of a residue deflector in which its fingers are spaced from one another such that the knives of the chopper pass between them.

FIG. 6 is a pictorial view that is similar FIG. 2, and similar items are similarly numbered. However, in the example shown in FIG. 6, the extending members 182 of residue deflector 160 are arranged in a single row and extend all the way toward chopper 140 so that their lower ends 186 are in the rotational travel path (indicated by arrows 202) of the knives 204 of chopper 140. Thus, in the example shown in FIG. 6, extending members 182 are spaced apart sufficiently that the knives 204 can pass between them, as they rotate in the direction indicated by arrows 202.

Figure 7:
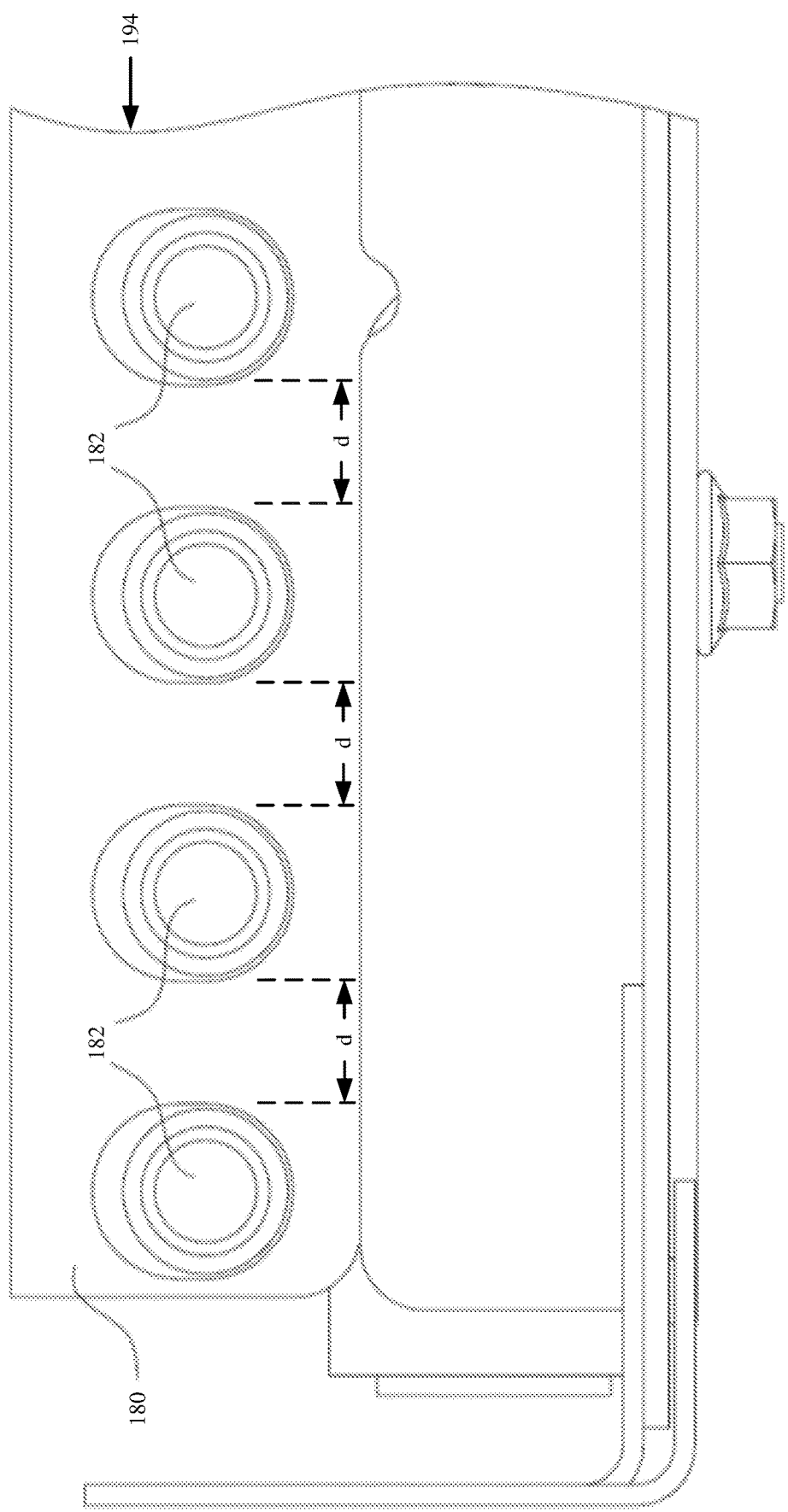

FIG. 7 is a pictorial illustration that is similar to FIG. 5 and similar items are similarly numbered. However, as can be seen in FIG. 7, extending members 182 are arranged in single row 194. They are also spaced by a sufficient distance d that the blades or knives 204 of chopper 140 can pass between them (as shown in FIG. 6).

Also, members 182 are shown with a circular cross section, but other cross sections can be used as well. Similarly, members 182 may be formed of solid rods made out of steel, fiberglass, or other material. They may be hollow rods, perforated rods, or other configurations. It should also be noted that the different embodiments described herein can be combined in different ways. That is, parts of one or more embodiments can be combined with parts of one or more other embodiments. All of this is contemplated herein.

Example 1 is a combine harvester, comprising:

a threshing system having an inlet end that receives crop and an outlet end through which crop residue passes;

a cleaning system having a set of cleaning system elements that receive crop from the threshing system and having a residue outlet end;

a cleaning system fan that directs airflow along an airflow path, through the set of cleaning system elements, through the outlet end of the cleaning system and toward an outlet of the combine harvester;

a chopper that has an inlet side and an outlet side; and a crop residue deflector configured for deployment, in a deployed position, in the airflow path of the cleaning system fan and at a position upstream, in the airflow path, of the outlet side of the chopper.

Example 2 is the combine harvester of any or all previous examples wherein the crop residue deflector comprises:

a first end section; and a plurality of extending members having first and second ends, the first ends of the plurality of extending members being coupled to the first end section and the second ends of the plurality of extending members being spaced from the first ends and spaced apart from one another and free of connection with one another.

Example 3 is the combine harvester of any or all previous examples wherein the combine harvester has a front end and a rear end spaced from one another in a front-to-rear direction and first and second sides spaced from one another in a side-to-side direction, wherein the first end section extends laterally across a portion of the combine harvester in the side-to-side direction and wherein the first ends of the plurality of extending members are connected to the first end section in a row extending across the first end section in the side-to-side direction.

Example 4 is the combine harvester of any or all previous examples wherein the first ends of a first subset of the plurality of extending members are connected to the first end section in a first row extending across the first end section in the side-to-side direction and wherein the first ends of a second subset of the plurality of extending members are connected to the first end section in a second row extending across the first end section in the side-to-side direction.

Example 5 is the combine harvester of any or all previous examples wherein the first and second rows are spaced from one another, when the residue deflector is in the deployed position, in the front-to-rear direction.

Example 6 is the combine harvester of any or all previous examples wherein the first row of extending members if offset from the second row of extending members in the side-to-side direction so a portion of airflow passing through the residue deflector takes a circuitous path when passing around the first and second subsets of extending members.

Example 7 is the combine harvester of any or all previous examples wherein the crop residue deflector is pivotally coupled to the combine harvester for pivotal movement between the deployed position and a stored position in which the crop residue deflector is substantially out of the airflow path.

Example 8 is the combine harvester of any or all previous examples and further comprising:

an actuator coupled to the residue deflector to drive movement of the residue deflector between the deployed position and the stored position.

Example 9 is the combine harvester of any or all previous examples wherein the chopper has a set of rotatable knives that rotate along a rotation path and wherein second ends of the extending members are spaced so when the crop residue deflector is in the deployed position, so the rotatable knives pass between the second ends of the extending members when the knives are rotating along the rotation path.

Example 10 is the combine harvester of any or all previous examples wherein the residue deflector is positioned, when in the deployed position, in the airflow path of the cleaning system fan and upstream, in the airflow path, of the inlet side of the chopper.

Example 11 is the combine harvester of any or all previous examples wherein the residue deflector is positioned, when in the deployed position, in the airflow path of the cleaning system fan and downstream, in the airflow path, of the residue outlet end of the cleaning system.

Example 12 is a combine harvester, comprising:

a threshing system having an inlet end that receives crop and an outlet end through which crop residue passes;

a discharge beater that moves crop residue away from the outlet end if the threshing system;

a cleaning system, having a sieve and chaffer, that receives crop from the threshing system and having a residue outlet end;

a cleaning system fan that directs airflow along an airflow path, through the sieve and chaffer, through the outlet end of the cleaning system and toward an outlet of the combine harvester;

a chopper that has an inlet side and an outlet side; and a crop residue deflector configured for deployment, in a deployed position, in the airflow path of the cleaning system fan and at a position upstream, in the airflow path, of the outlet side of the chopper the crop residue deflector including a first end section and a plurality of extending members having first and second ends, the first ends of the plurality of extending members being coupled to the first end section and the second ends of the plurality of extending members being spaced from the first ends and spaced apart from one another and free of connection with one another.

Example 13 is the combine harvester of any or all previous examples wherein the combine harvester has a front end and a rear end spaced from one another in a front-to-rear direction and first and second sides spaced from one another in a side-to-side direction, wherein the first end section extends laterally across a portion of the combine harvester in the side-to-side direction and wherein the first ends of the plurality of extending members are connected to the first end section in a row extending across the first end section in the side-to-side direction.

Example 14 is the combine harvester of any or all previous examples wherein the first ends of a first subset of the plurality of extending members are connected to the first end section in a first row extending across the first end section in the side-to-side direction and wherein the first ends of a second subset of the plurality of extending members are connected to the first end section in a second row extending across the first end section in the side-to-side direction.

Example 15 is the combine harvester of any or all previous examples wherein the first and second rows are spaced from one another, when the residue deflector is in the deployed position, in the front-to-rear direction.

Example 16 is the combine harvester of any or all previous examples wherein the first row of extending members if offset from the second row of extending members in the side-to-side direction so a portion of airflow passing through the residue deflector takes a circuitous path when passing around the first and second subsets of extending members.

Example 17 is the combine harvester of any or all previous examples wherein the plurality of extending members each have a thickness, in the side-to-side direction and are spaced from one another a distance of approximately one to three times the thickness.

Example 18 is the combine harvester of any or all previous examples wherein the crop residue deflector is pivotally coupled to the combine harvester for pivotal movement between the deployed position and a stored position in which the crop residue deflector is substantially out of the airflow path, and further comprising:

an actuator coupled to the residue deflector to drive movement of the residue deflector between the deployed position and the stored position.

Example 19 the combine harvester of any or all previous examples wherein the chopper has a set of rotatable knives that rotate along a rotation path and wherein second ends of the extending members are spaced so when the crop residue deflector is in the deployed position, so the rotatable knives pass between the second ends of the extending members when the knives are rotating along the rotation path.

Example 20 is a combine harvester, comprising:

a threshing system having an inlet end that receives crop and an outlet end through which crop residue passes;

a discharge beater that moves crop residue away from the outlet end if the threshing system;

a cleaning system, having a sieve and chaffer, that receives crop from the threshing system and having a residue outlet end;

a cleaning system fan that directs airflow along an airflow path, through the sieve and chaffer, through the outlet end of the cleaning system and toward an outlet of the combine harvester;

a chopper that has an inlet side and an outlet side; and a crop residue deflector configured for deployment, in a deployed position, in the airflow path of the cleaning system fan and at a position upstream, in the airflow path, of the outlet side of the chopper the crop residue deflector including a first end section and a plurality of extending members having first and second ends, the first ends of the plurality of extending members being coupled to the first end section and the second ends of the plurality of extending members being spaced from the first ends and spaced apart from one another and free of connection with one another, wherein the combine harvester has a front end and a rear end spaced from one another in a front-to-rear direction and first and second sides spaced from one another in a side-to-side direction, wherein the first end section extends laterally across a portion of the combine harvester in the side-to-side direction and wherein the first ends of the plurality of extending members are connected to the first end section in a row extending across the first end section in the side-to-side direction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A combine harvester, comprising:
    a front end and a rear end spaced apart from one another in a front-to-rear direction;
    a first side and a second side spaced from one another in a side-to-side direction;
    a threshing system having an inlet end that receives crop and an outlet end through which crop residue passes;
    a cleaning system having a set of cleaning system elements that receive crop from the threshing system and having a residue outlet end;
    a cleaning system fan that directs airflow along an airflow path, through the set of cleaning system elements, through the outlet end of the cleaning system and toward an outlet of the combine harvester;
    a chopper that has an inlet side and an outlet side; and
    a crop residue deflector pivotally coupled to the combine harvester for pivotal movement between a deployed position in the airflow path of the cleaning system fan that defines a crop residue path toward the inlet side of the chopper and a stored position substantially out of the airflow path of the cleaning system fan that defines a crop residue path over the chopper, the crop residue deflector comprising:
        a first end section that extends laterally across at least a portion of the combine harvester in the side-to-side direction; and
        a plurality of extending members having first and second ends, the first ends of the plurality of extending members being coupled to the first end section and spaced apart from one another and the second ends of the plurality of extending members being spaced from the first ends and spaced apart from one another, wherein the plurality of extending members comprises a first subset of extending members and a second subset of extending members, the first ends of the first subset of extending members are spaced apart from the first ends of the second subset of extending members, when the crop residue deflector is in the deployed position, in the front-to-rear direction.

2. The combine harvester of claim 1 wherein the first subset of extending members are connected to the first end section in a row extending across the first end section in the side-to-side direction.

3. The combine harvester of claim 2 wherein the second subset of the plurality of extending members are connected to the first end section in a second row extending across the first end section in the side-to-side direction.

4. The combine harvester of claim 3 wherein the first row of extending members is offset from the second row of extending members in the side-to-side direction so a portion of airflow passing through the residue deflector takes a circuitous path when passing around the first and second subsets of extending members.

5. The combine harvester of claim 1 and further comprising:
    an actuator coupled to the residue deflector to drive movement of the residue deflector between the deployed position and the stored position.

6. The combine harvester of claim 5 and further comprising:
    a control system that generates a control signal to the actuator to drive movement of the residue deflector between the deployed position and the stored position.

7. The combine harvester of claim 1 wherein the chopper has a set of rotatable knives that rotate along a rotation path and wherein the second ends of the extending members are spaced so, when the crop residue deflector is in the deployed position, the rotatable knives pass between the second ends of the extending members when the knives are rotating along the rotation path.

8. The combine harvester of claim 1 wherein the residue deflector is positioned, when in the deployed position, in the airflow path of the cleaning system fan and upstream, in the airflow path, of the inlet side of the chopper.

9. The combine harvester of claim 1 wherein the residue deflector is positioned, when in the deployed position, in the airflow path of the cleaning system fan and downstream, in the airflow path, of the residue outlet end of the cleaning system.

10. The combine harvester of claim 1, wherein the extending members have a circular cross section.

11. A combine harvester, comprising:
    a front end and a rear end spaced from one another in a front-to-rear direction;
    a first side and a second side spaced from one another in a side-to-side direction;
    a threshing system having an inlet end that receives crop and an outlet end through which crop residue passes;
    a discharge beater that moves crop residue away from the outlet end of the threshing system;
    a cleaning system, having a sieve and chaffer, that receives crop from the threshing system and having a residue outlet end;
    a cleaning system fan that directs airflow along an airflow path, through the sieve and chaffer, through the outlet end of the cleaning system and toward an outlet of the combine harvester;
    a chopper that has an inlet side and an outlet side;
    a crop residue deflector pivotally coupled to the combine harvester for pivotal movement between a stored position and a deployed position, wherein, when the crop residue deflector is in the deployed position it is disposed in the airflow path of the cleaning system fan and at a position upstream, in the airflow path, of the outlet side of the chopper, the crop residue deflector comprising:
- a first end section that extends laterally across at least a portion of the combine harvester in the side-to-side direction and a plurality of extending members having first and second ends, the first ends of the plurality of extending members being coupled to the first end section and the second ends of the plurality of extending members being spaced from the first ends and spaced apart from one another and free of connection with one another, wherein a first subset of the plurality of extending members are connected to the first end section in a first row extending across the first end section in the side-to-side direction and wherein the first ends of a second subset of the plurality of extending members are connected to the first end section in a second row extending across the first end section in the side-to-side direction;
- an actuator coupled to the residue deflector to drive movement of the residue deflector between the deployed position and the stored position; and
- a control system configured to generate a control signal to control the actuator to drive movement of the residue deflector between the deployed position and the stored position.

12. The combine harvester of claim 11 wherein the first and second rows are spaced from one another, when the residue deflector is in the deployed position, in the front-to-rear direction.

13. The combine harvester of claim 12 wherein the first row of extending members is offset from the second row of extending members in the side-to-side direction so a portion of airflow passing through the residue deflector takes a circuitous path when passing around the first and second subsets of extending members.

14. The combine harvester of claim 11 wherein the plurality of extending members each have a thickness, in the side-to-side direction and are spaced from one another a distance of approximately one to three times the thickness.

15. The combine harvester of claim 11 wherein the chopper has a set of rotatable knives that rotate along a rotation path and wherein the second ends of the extending members are spaced so, when the crop residue deflector is in the deployed position, the rotatable knives pass between the second ends of the extending members when the knives are rotating along the rotation path.

16. The combine harvester of claim 11, wherein the control signal is based on an input received by the control system.

17. The combine harvester of claim 11, wherein the extending members have a circular cross section.

18. A combine harvester, comprising:
- a front end and a rear end spaced apart from one another in a front-to-rear direction;
- a first side and a second side spaced from one another in a side-to-side direction;
- a threshing system having an inlet end that receives crop and an outlet end through which crop residue passes;
- a discharge beater that moves crop residue away from the outlet end of the threshing system;
- a cleaning system, having a sieve and chaffer, that receives crop from the threshing system and having a residue outlet end;
- a cleaning system fan that directs airflow along an airflow path, through the sieve and chaffer, through the outlet end of the cleaning system and toward an outlet of the combine harvester;
- a chopper that has an inlet side and an outlet side;
- a crop residue deflector configured for deployment, in a deployed position, in the airflow path of the cleaning system fan and at a position upstream, in the airflow path, of the outlet side of the chopper, the crop residue deflector including a first end section and a plurality of extending members having first and second ends, the first ends of the plurality of extending members being coupled to the first end section and the second ends of the plurality of extending members being spaced from the first ends and spaced apart from one another and free of connection with one another such that a portion of the airflow passing through the residue deflector takes a circuitous path when passing around the plurality of extending members, wherein the first end section extends laterally across at least a portion of the combine harvester in the side-to-side direction and wherein the first ends of the plurality of extending members are connected to the first end section and extend across at least a portion of the first end section in the side-to-side direction;
- an actuator coupled to the residue deflector to drive movement of the residue deflector to the deployed position; and
- a control system generates a control signal to control the actuator to drive movement of the residue deflector to the deployed position.

19. The combine harvester of claim 6, wherein the extending members have a circular cross section.

20. The combine harvester of claim 6, wherein the control signal is based on an operator input.

* * * * *